(12) United States Patent
Webb et al.

(10) Patent No.: US 10,575,305 B2
(45) Date of Patent: *Feb. 25, 2020

(54) MOBILE COMMUNICATIONS NETWORK, COMMUNICATIONS DEVICE AND METHODS WITH NESTED CARRIER AGGREGATION

(71) Applicant: SONY CORPORATION, Tokyo (JP)

(72) Inventors: Matthew William Webb, Basingstoke (GB); Jussi Kahtava, Basingstoke (GB); Dimitris Koulakiotis, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,167

(22) Filed: Jul. 25, 2018

(65) Prior Publication Data

US 2018/0359756 A1 Dec. 13, 2018

Related U.S. Application Data

(63) Continuation of application No. 15/108,699, filed as application No. PCT/EP2014/078295 on Dec. 17, 2014, now Pat. No. 10,051,628.

(30) Foreign Application Priority Data

Jan. 15, 2014 (EP) .................................... 14151347

(51) Int. Cl.
*H04L 12/28* (2006.01)
*H04W 72/04* (2009.01)
(Continued)

(52) U.S. Cl.
CPC ......... *H04W 72/0453* (2013.01); *H04L 5/001* (2013.01); *H04L 5/0007* (2013.01);
(Continued)

(58) Field of Classification Search
None
See application file for complete search history.

(56) References Cited

U.S. PATENT DOCUMENTS

2009/0285116 A1* 11/2009 Nanda .................. H04W 72/02
370/252
2010/0118720 A1 5/2010 Gauvreau
(Continued)

FOREIGN PATENT DOCUMENTS

| EP | 2632183 | 8/2013 |
|---|---|---|
| WO | 2011050854 | 5/2011 |

(Continued)

OTHER PUBLICATIONS

International Search Report dated Mar. 6, 2015 in PCT/EP2014/078295 filed on Dec. 17, 2014.
(Continued)

*Primary Examiner* — Kwang B Yao
*Assistant Examiner* — Juvena W Loo
(74) *Attorney, Agent, or Firm* — Xsensus LLP

(57) ABSTRACT

A communications device can transmit and receive data via a wireless access interface provided by a mobile communications network including an infrastructure equipment for transmitting signals to or receiving signals from the communications device. The wireless access interface provides a primary carrier within a first frequency range, which forms a primary cell providing a contiguous set of communications resources across the first frequency range and providing one or more control channels for transmitting signaling message to the communications device or receiving signaling messages from the infrastructure equipment. A controller in combination with a receiver and transmitter can receive from the infrastructure equipment a signaling message identifying a nested carrier including one or more candidate channels selected from a predefined plurality of candidate
(Continued)

channels within a second frequency range which is different to and mutually exclusive from the first frequency range.

13 Claims, 10 Drawing Sheets

(51) Int. Cl.
*H04L 5/00* (2006.01)
*H04L 27/00* (2006.01)
*H04W 84/12* (2009.01)
*H04W 88/12* (2009.01)

(52) U.S. Cl.
CPC .......... *H04L 5/0041* (2013.01); *H04L 5/0073* (2013.01); *H04L 5/0069* (2013.01); *H04L 27/0006* (2013.01); *H04W 84/12* (2013.01); *H04W 88/12* (2013.01)

(56) References Cited

U.S. PATENT DOCUMENTS

| | | | |
|---|---|---|---|
| 2011/0081913 | A1 | 4/2011 | Lee |
| 2011/0103243 | A1 | 5/2011 | Larsson |
| 2011/0188594 | A1* | 8/2011 | Kim ............... H04L 1/0067 375/260 |
| 2011/0243034 | A1* | 10/2011 | Yamada ............... H04L 5/001 370/254 |
| 2012/0063373 | A1 | 3/2012 | Chincholi et al. |
| 2012/0140743 | A1 | 6/2012 | Pelletier et al. |
| 2013/0077554 | A1* | 3/2013 | Gauvreau ............... H04L 5/001 370/312 |
| 2013/0235837 | A1 | 9/2013 | Suo |
| 2013/0308519 | A1 | 11/2013 | Gou et al. |
| 2013/0336156 | A1 | 12/2013 | Wei et al. |
| 2013/0344883 | A1 | 12/2013 | Rinne et al. |
| 2014/0119339 | A1* | 5/2014 | Yang ............... H04L 5/001 370/331 |
| 2014/0185497 | A1* | 7/2014 | Wolf ............... H04W 28/26 370/294 |
| 2015/0156636 | A1* | 6/2015 | Tabet ............... H04W 16/14 370/329 |
| 2015/0237609 | A1 | 8/2015 | Sun |
| 2017/0195901 | A1* | 7/2017 | Zhou ............... H04W 24/02 |

FOREIGN PATENT DOCUMENTS

| | | |
|---|---|---|
| WO | 2012078565 | 6/2012 |
| WO | 2012116489 | 9/2012 |
| WO | 2012123616 | 9/2012 |

OTHER PUBLICATIONS

"3rd Generation Partnership Project; Technical Specification Group Radio Access Network; Evolved Universal Terrestrial Radio Access (E-UTRA); Physical channels and modulation (Release 11)", 3GPP TS 36.211, V11.5.0, Dec. 2013, pp. 1-120.

"3rd Generation Partnership Project; Technical Specification Group Radio Access Network; Evolved Universal Terrestrial Radio Access (E-UTRA); Multiplexing and channel coding (Release 12)", 3GPP TS 36.212, V12.0.0, Dec. 2013, pp. 1-88.

"3rd Generation Partnership Project; Technical Specification Group Radio Access Network; Evolved Universal Terrestrial Radio Access (E-UTRA); Physical layer procedures (Release 12)", 3GPP TS 36.213, V12.0.0, Dec. 2013, pp. 1-186.

"3rd Generation Partnership Project; Technical Specification Group Radio Access Network; Evolved Universal Terrestrial Radio Access (E-UTRA); Medium Access Control (MAC) protocol specification (Release11)", 3GPP TS 36.321, V11.3.0, Jun. 2013, pp. 1-57.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.5.0, Sep. 2013, paQes 1-347.

* cited by examiner

Definition of candidate channels within U-resources and logical aggregation of some candidate channels into a nested carrier. (NB other wireless systems are transmitting in any parts of the unlicensed band, including those not used by any activated candidate channel).

PDCCH and EPDCCH arrangement in the candidate channels comprising a nested carrier.

Multiple U-UEs can have NCs comprising different CaCs.
The respective Scell NCs are all aggregated with the same LTE-A Pcell.

Spatial re-use of candidate channels within a macrocell

US 10,575,305 B2

MOBILE COMMUNICATIONS NETWORK, COMMUNICATIONS DEVICE AND METHODS WITH NESTED CARRIER AGGREGATION

CROSS-REFERENCE TO RELATED APPLICATIONS

This present application is a Continuation Application of U.S. application Ser. No. 15/108,699, filed Jun. 28, 2016, which was the National stage of International Application Number PCT/EP2014/078295, filed Dec. 17, 2014, which claimed priority to EP Application Number 14151347.3, filed on Jan. 15, 2014, the entire contents of each of which are hereby incorporated herein by reference in their entirety.

TECHNICAL FIELD OF THE DISCLOSURE

The present disclosure relates to mobile communications networks and methods for communicating data using mobile communications networks, infrastructure equipment for mobile communications networks, communications devices for communicating data via mobile communications networks and methods of communicating via mobile communications networks.

BACKGROUND OF THE DISCLOSURE

Radio frequency spectrum, which has been licensed to an operator grants exclusive use to the operator to deploy a mobile communications network (e.g. GSM, WCDMA/HSPA, LTE/LTE-A) using that licensed spectrum. As a result, the operator has exclusive control of the radio resources provided by the licensed spectrum. Since the first generation of cellular network deployments decades ago, licensed spectrum has traditionally been assigned to operators either via government-organised auctions, or so-called "beauty contests".

Unlicensed spectrum is used by a number of technologies including Wi-Fi and Bluetooth. In contrast to licensed spectrum use, unlicensed spectrum can be shared and used among different technologies, which are not following any co-ordinated/centralised protection against interference. As a result performance of technologies in unlicensed spectrum is subject to unpredictable interference and therefore operation in unlicensed bands can be difficult.

A licensed cellular network technology like LTE would require new mechanisms that would allow it to co-exist with other radio access technologies and share unlicensed spectrum bands. Examples of such mechanisms are spread spectrum, frequency hopping, dynamic frequency selection, listen before talk and collision avoidance.

Deploying a mobile communications network in an unlicensed spectrum, which has been configured to operate in a licensed spectrum and therefore has previously been expected to have exclusive use of a contiguous set of communications resources represents a technical challenge.

SUMMARY OF THE DISCLOSURE

According to a first aspect there is provided a communications device for transmitting data to or receiving data from a mobile communications network. The mobile communications network includes an infrastructure equipment, the infrastructure equipment provides a wireless access interface for transmitting signals to or receiving signals from the communications device. The communications device comprises a transmitter configured to transmit the signals to the infrastructure equipment via the wireless access interface, a receiver configured to receive the signals from the infrastructure equipment via the wireless access interface, and a controller for controlling the transmitter and the receiver to receive data transmitted to the communications device from the infrastructure equipment via the wireless access interface. The wireless access interface provides a primary carrier within a first frequency range, which forms a primary cell providing a contiguous set of communications resources across the first frequency range and providing one or more control channels for transmitting signaling message to the communications device or receiving signaling messages from the infrastructure equipment. The first frequency range for example is a licensed frequency band, providing contiguous communications resources for which the mobile communications network has exclusive access. The controller is configured in combination with the receiver and transmitter to receive from the infrastructure equipment a signaling message identifying a nested carrier comprising one or more candidate channels selected from a predefined plurality of candidate channels within a second frequency range which is different to and mutually exclusive from the first frequency range. For example the second frequency range may be an unlicensed frequency band. Each of the one or more selected candidate channels, represents a minimum unit of communications resource which can be used to transmit data via the up-link or to receive data on the downlink. The one or more selected candidate channels in the second frequency range is formed by the infrastructure equipment into the nested carrier for providing a secondary cell. The signaling message being transmitted from the infrastructure equipment via the control channel of the first frequency range, and the controller is configured to control the receiver to receive from the infrastructure equipment at least a part of the data or the controller is configured to control the transmitter to transmit to the infrastructure equipment at least a part of the data within the nested carrier.

Interference variations in time and frequency across an unlicensed or shared bandwidth are unknown and unpredictable. The interfering system could be LTE-A, or any existing unlicensed wireless system such as WiFi, or any combination of similar wireless systems. Fundamentally, an infrastructure equipment is trying to access uncontrolled resources whereas a conventional mobile communications network, such as LTE normally works in controlled frequency resources and therefore have exclusive use of those resources. Nevertheless, it is desirable a mobile communications network which uses an unlicensed spectrum, such as, for example the LTE-U band, be arranged to as far as possible provide communications resources from the unlicensed band as if operating in the licensed band.

At present, however, no defined mechanisms exist for a mobile communications network either to obtain information about the channel quality of an unlicensed or shared band, nor for the network to configure a UE to make efficient and flexible use of the additional resources from an unlicensed frequency band. This invention discloses a method for creating both capabilities.

Embodiments of the present technique can provide an arrangement in which a mobile communications network is configured to identify candidate resources, referred to as candidate channels, which can be combined into an aggregated or nested resource or carrier for allocation to communications devices as if those communications resources on the unlicensed frequency band were allocated from a licensed frequency band. In some example the candidate channels are identified from a non-contiguous set of frequency resources.

According to some embodiments the second frequency band which may be an unlicensed frequency band is divided in accordance with a pre-specified arrangement into a plurality of candidate channels. Thus the candidate channels in the second frequency band are predetermined, but not all will be available because other interfering signals may be transmitted by other communications systems in the second frequency band because the second frequency band may for example be unlicensed. An infrastructure equipment is arranged to compare an interference pattern of signals within the second frequency band with the pre-specified plurality of candidate channels and to select from the plurality of candidate channels the one or more candidate channels which form the nested carrier.

Various further aspects and features of the present disclosure are defined in the appended claims and include a communications device, a method of receiving data using a communications device, a mobile communications network, an infrastructure equipment and a method of transmitting data from a mobile communications network.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Example of an LTE System

Figure 1:
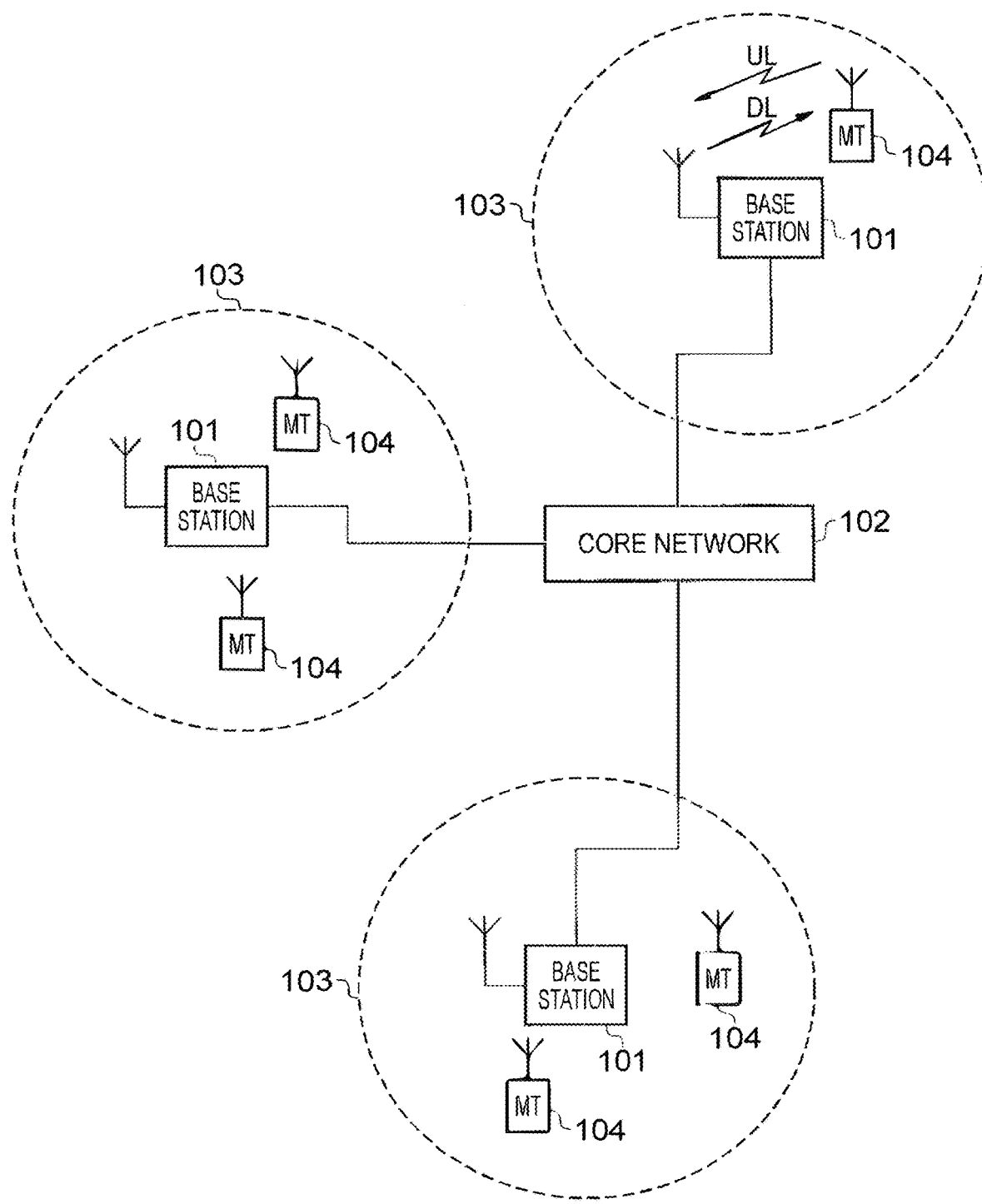
FIG. 1 provides a schematic diagram illustrating an example of a conventional mobile telecommunication network.

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from communications devices (also referred to as mobile terminals, MT or User equipment, UE) 104. Data is transmitted from base stations 101 to communications devices 104 within their respective coverage areas 103 via a radio downlink. Data is transmitted from communications devices 104 to the base stations 101 via a radio uplink. The core network 102 routes data to and from the terminal devices 104 via the respective base stations 101 and provides functions such as authentication, mobility management, charging and so on.

Mobile communications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
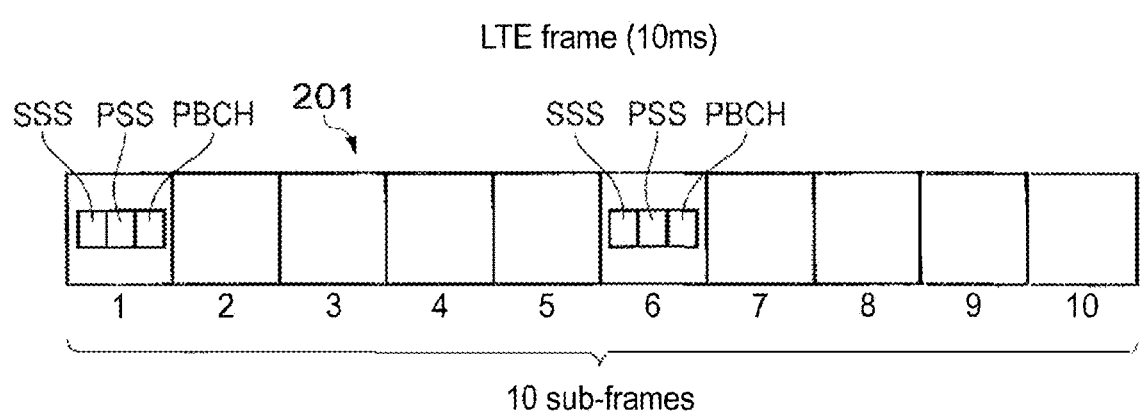
FIG. 2 provides a schematic diagram illustrating a conventional LTE radio frame.

FIG. 2 shows a schematic diagram illustrating an OFDM based LTE downlink radio frame 201. The LTE downlink radio frame is transmitted from an LTE base station (known as an enhanced Node B (eNB)) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE radio frame, in frequency division duplex (FDD). A physical broadcast channel (PBCH) is transmitted in the first sub-frame of the LTE radio frame. The PSS, SSS and PBCH are discussed in more detail below.

Figure 3:
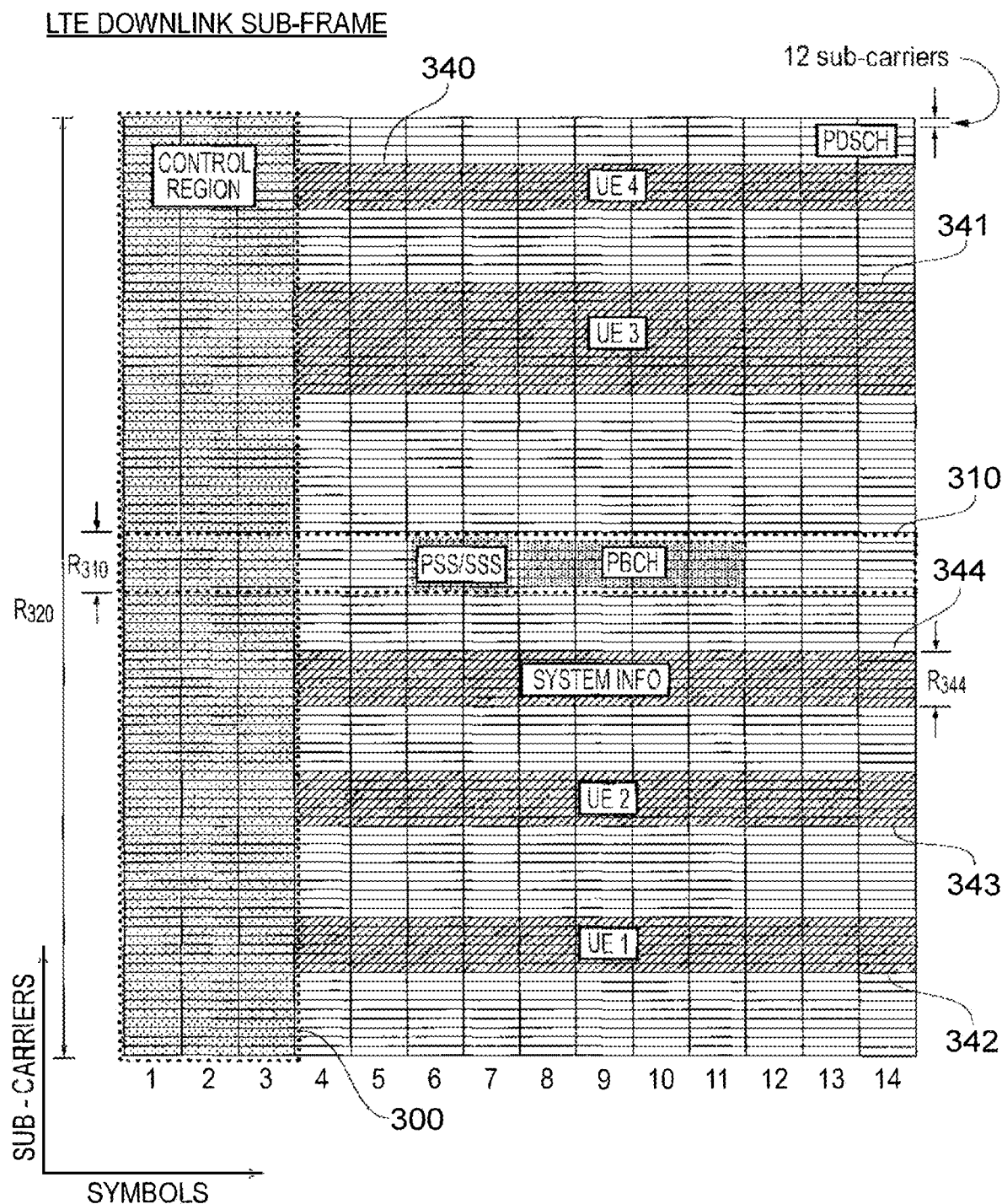
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of "symbols", which are each transmitted over a respective 1/14 ms period. Each symbol comprises a predetermined number of orthogonal sub-carriers distributed across the bandwidth of the downlink radio carrier. Here, the horizontal axis represents time while the vertical represents frequency.

The example sub-frame shown in FIG. 3 comprises 14 symbols and 1200 sub-carriers spread across a 20 MHz bandwidth, $R_{320}$. The smallest allocation of user data for transmission in LTE is a "physical resource block" also termed a "resource block" comprising twelve sub-carriers transmitted over one slot (0.5 sub-frame). Each individual box in the sub-frame grid in FIG. 3 corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (typically between one and three symbols, but four symbols being contemplated to support 1.4 MHz channel bandwidth).

PHICH contains HARQ (Hybrid Automatic Request) data indicating whether or not previously transmitted uplink data has been successfully received by the network.

Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the eNodeB 101 transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH 344 containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional LTE communications device must be able to receive the entire channel bandwidth in order to receive and decode the control region.

Figure 4:
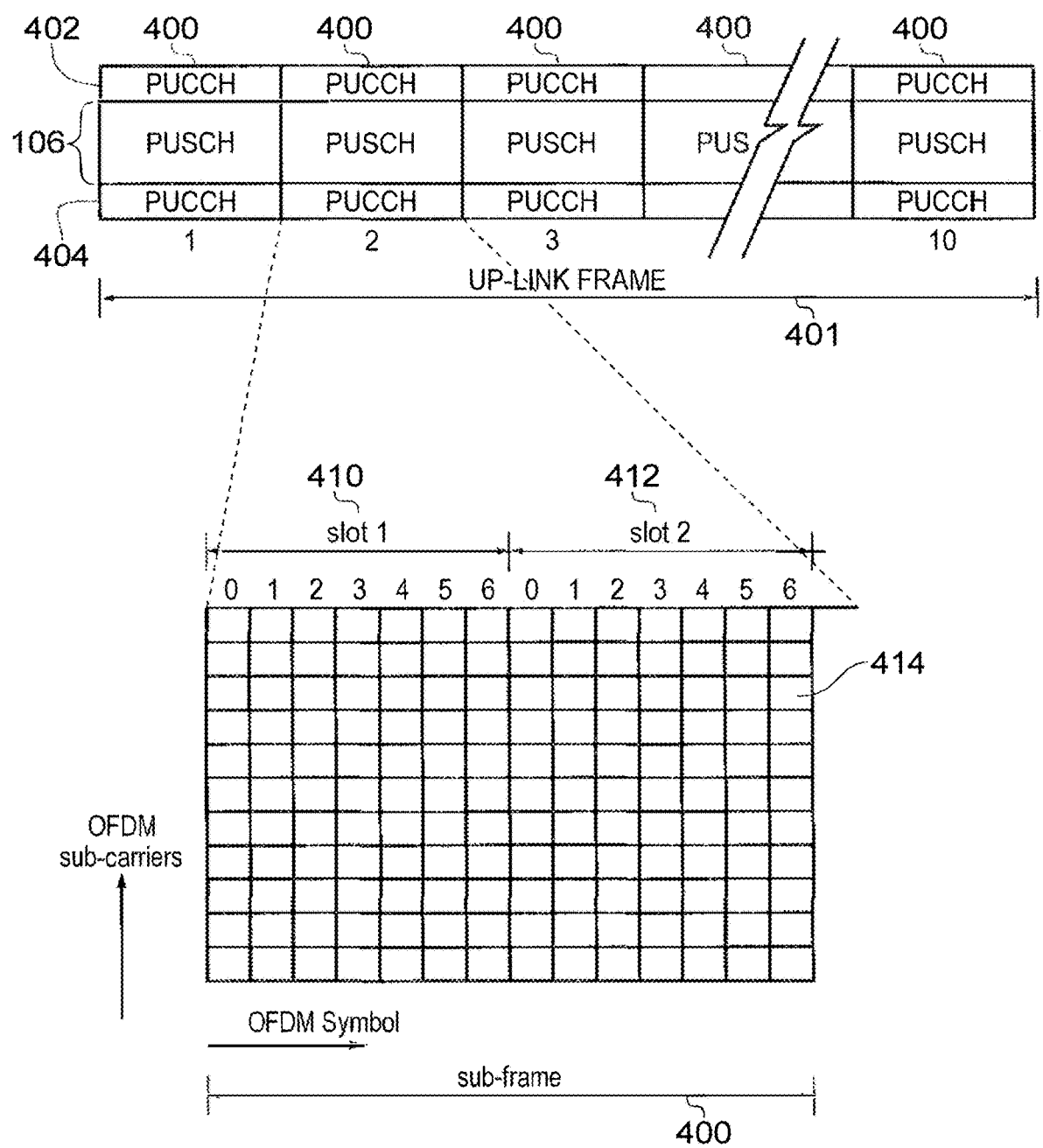
FIG. 4 provides a schematic diagram illustrating an example of an LTE up-link radio frame and sub-frame.

As shown in FIG. 4, a representation is provided of an up-link of an LTE communications system. As shown in FIG. 4, the up-link frequency band of an FDD LTE deployment comprises ten sub-frames within each frame 401. Within each of the subframes there is provided a frequency resource at the top and bottom of the frequency band 402, 404 which is devoted to an uplink control channel, which is the physical uplink control channel (PUCCH). Within a centre portion of the frequency band there is provided communications resources for allocation to communications devices to transmit signals to the eNodeB 101 on the uplink, which is referred to as the physical uplink shared channel (PUSCH) 406. As shown in FIG. 4, each of the sub frames 400 is divided into two time slots 410, 412. Within each time slot the frequency resources are grouped into sets of 12 subcarriers so that on the Y axis the elements 414 represent OFDM subcarriers and along the X axis OFDM symbols. The timeslots are provided in order to provide some frequency diversity for the transmission for example of the PUCCH between different subcarriers at either end of the frequency band, between different ones of the timeslots 410, 412. Some of the symbols shown in FIG. 4 will be used for reference symbols and other symbols will be used for carrying data symbols in accordance with the LTE standard.

Utilising an Un-Licensed Frequency Band

Embodiments of the present technique can provide an arrangement in which a base station determines an interference pattern within an unlicensed frequency band and based on the determined interference identifies whether or not one or more candidate resources or carriers can be deployed within that unlicensed frequency band. A candidate channel represents a minimum unit of communications resource which can be used to transmit data via the up-link or to receive data on the downlink in accordance with a configuration of a wireless communications interface which is specified for a communications system for which the base station has primarily been deployed. The minimum resource allocation could be a segment of communications resource such as one sub-carrier or may be at least one physical resource block (PRB) or twelve sub-carriers. For the example of LTE, there is a base station operating in accordance with LTE as an eNodeB 101 as shown in FIG. 1 using the frequency resources of an LTE-A frequency band. Thus the uplink and the downlink can be deployed in accordance with the LTE Standard as explained with reference to FIGS. 1 to 4. The definition of candidate channels is discussed further below, but in typical examples they are defined by amended 3GPP system specifications to give a lower and an upper frequency for each candidate channel, or similar configuration is transmitted to terminals by the network. The base station obtains from terminals or performs measurements and assessments of an unlicensed frequency band such as the LTE-U band and determines if it can form some of the candidate channels within the LTE-U band into a nested carrier within the communications resources which are available within the LTE-U band. Depending upon the interference pattern which is present within the LTE-U band, the eNodeB may form a nested carrier comprising a non-continuous set of communications resources in which a candidate channel may be separated from another candidate channel by a section of frequency in which unsuitable interference signals are present and so the section of frequency cannot be used by the eNodeB.

Figure 5:
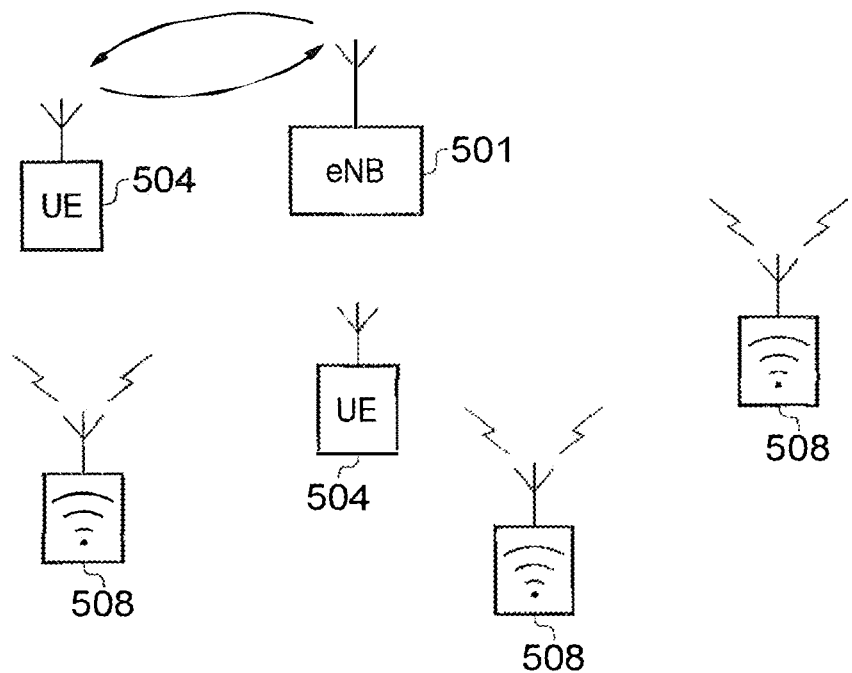
FIG. 5 provides a schematic block of a base station (or eNodeB) operating to provide a wireless access interface, which includes a first licensed frequency band and a second unlicensed frequency band.

A diagram presenting an arrangement in which the present technique finds application is shown in FIG. 5.

As shown in FIG. 5, an example of a base station 101 which is an eNodeB is transmitting and receiving signals to and from a user equipment, UE 504. The eNodeB 501 is transmitting data to the user equipment 504 on the downlink within the LTE-A band and receiving data on the uplink from the user equipment 501 transmitted within the uplink of the LTE-A band. This arrangement is presented graphically in FIG. 6 where the LTE-A band is shown for an example deployment. Therefore the communication of signals with the UE 501 within the LTE-A band is in accordance with a conventional deployment as described with reference to FIGS. 1 to 4 and therefore in the following description forms a "primary cell" for communication with the user equipment shown in FIG. 5.

Figure 6:
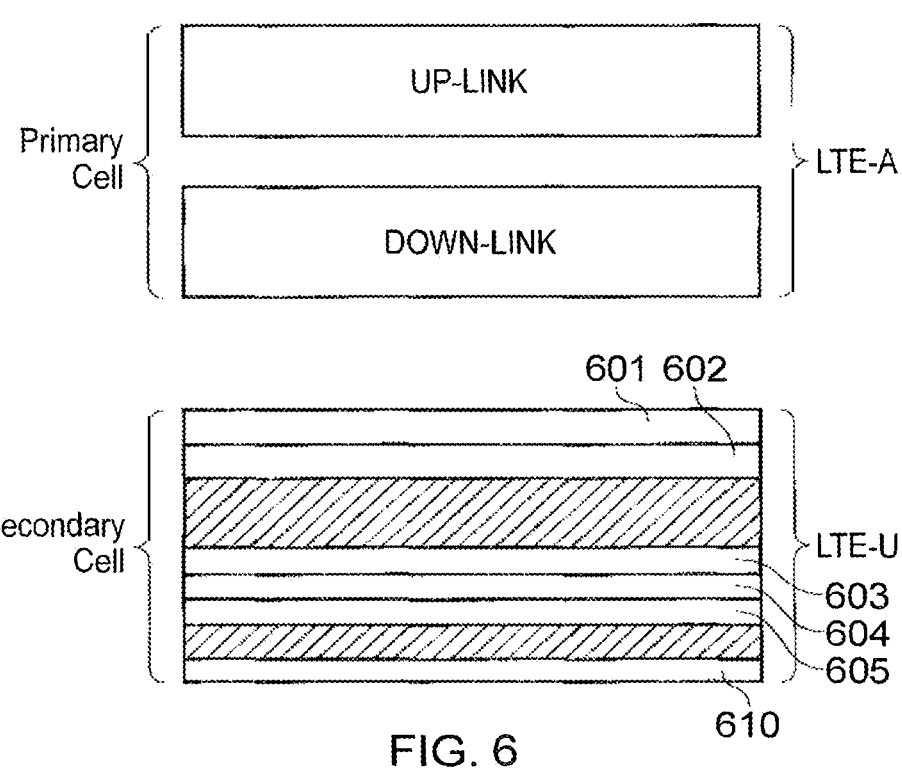
FIG. 6 provides a schematic illustration of a deployment of a wireless access interface, which includes a first licensed frequency band and a second unlicensed frequency band.

Also shown in FIG. 5 is a plurality of access points 508 which may operate in accordance with a Wi-Fi standard or any other wireless technology standard suitable for operation in the unlicensed band to transmit and receive data in accordance with that standard. The transmission of signals may be for example within the LTE-U band, which is unlicensed. However, the wireless access points 508 may not transmit signals in all of the unlicensed band so that some communications resources may be available for transmission in accordance with the LTE Standard. Accordingly, the eNodeB 501 determines the interference caused by the wireless access points 508 and identifies communications resources within the unlicensed frequency (U) band, which cannot be used and correspondingly those communications resources, which can be used. This arrangement is shown in FIG. 6 where the hashed area represents communications resources where interference is present whereas the remaining communications resource, which is not hashed is suitable for use by the eNodeB to transmit or receive signals to the user equipment using the LTE Standard. As will be explained shortly the eNodeB determines which candidate channels with the U-frequency band have interference characteristics such that they are suitable for forming into a nested carrier. As an exaggerated illustration, in FIG. 6 the LTE-U band can be divided into five candidate channels 601, 602, 603, 604, 605. However the bottom portion of the frequency band 610 has unsuitable interference characteristics according to measurements received from the UE, e.g. too high power of interfering signals for a candidate channel to be deployed, and accordingly candidate channels in this resource are not used. The eNodeB 501 determines that five candidate channels are suitable within the LTE-U band.

According to the present technique, a user equipment which is configured to use carrier aggregation techniques can be arranged under the control of an eNodeB 501 to transmit or receiver via a primary part of the wireless access interface (primary cell) and then receive additional communications resources via either the up-link or the down-link using the LTE-U band. A UE, which is configured according to this arrangement, will be referred to as a 'U-UE', because it is provided with an additional aggregated carrier from LTE-U resources (henceforth the 'U-resources'). Accordingly the LTE-A carrier provides primary cell and the LTE-U resources provide a secondary cell. Typically, the LTE-A carrier and the LTE-U transmission, and thus Primary cell and Secondary cell, will both be from the same eNodeB, although in other examples they can be provided from separate eNodeBs 501. The LTE-U carrier could in general be utilised with TDD or FDD frame structures.

One example LTE-U scenario is where the U-resources span a total bandwidth which is only moderately larger than the LTE-A system bandwidth, e.g. a U-bandwidth of 30 MHz. In this scenario, the resources could be heavily occupied.

Candidate Channels

Due to the nature of the un-licensed spectrum, a constraint of LTE-U operation is that the channel quality of the U-resources can vary significantly over frequency and time in a way that an eNodeB cannot control. Therefore, in one example CQI feedback is provided from a U-UE regarding the current state of the U-resources. As explained above, the eNodeB determines a number of candidate channels across the U-resources. Alternatively, the communications system may be pre-configured when deployed to identify a number of candidate channels across the U-resources. A single candidate channel is a contiguous RF and baseband radio resource, which the eNodeB considers for communication use to the U-UE in the U-resources. The U-UE is configured by the eNodeB 501 on a Primary cell to provide measurement feedback for some or all of the defined candidate channels. The bandwidth of each candidate channel affects a trade-off between granularity of feedback and the overhead of measurement and feedback. Therefore, according to one example of the present technique each candidate channel is of a baseband bandwidth suitable for use as a normal LTE carrier and therefore can also be termed "candidate carrier", and the atomic candidate carrier unit is the smallest supported LTE system bandwidth, i.e. 6 PRBs. Therefore the candidate channel is in one example a minimum quantity of communications resources which could be used to form a deployment of a wireless communications interface on the Primary cell. However, other bandwidths are also suitable for candidate channels. For example, a candidate channel could be the width of one PRB, allowing a finer-grained forming of nested carriers. For example, a candidate channel could be the bandwidth of one OFDM subcarrier—the minimum unit of resource that a UE or U-UE can processes transmission or reception of LTE signals on. The bandwidth of an OFDM subcarrier is pre-defined for the operation of the transmitter or the receiver.

The candidate channels can be pre-defined and therefore pre-configured according to a system specification, where a straightforward approach is to define them as non-overlapping and adjacent portions of the LTE-U resources. This then requires no configuration signalling from the eNodeB. An alternative is that the eNodeB can define candidate channels via a Primary cell using radio resource control (RRC) signalling. In either case, it is envisaged that a coherent solution, given the above definition and purpose of a candidate channel, is that all candidate channels are the same bandwidth. However in general this may not be applicable in all cases, so that candidate channels may have different bandwidths within the U-resources.

Measurement feedback information from UEs 504 to the eNodeB 501 can include measurements defined on other radio access technologies if the UE is able to obtain them. An example illustration is provided in FIGS. 7 and 8.

Figure 7:
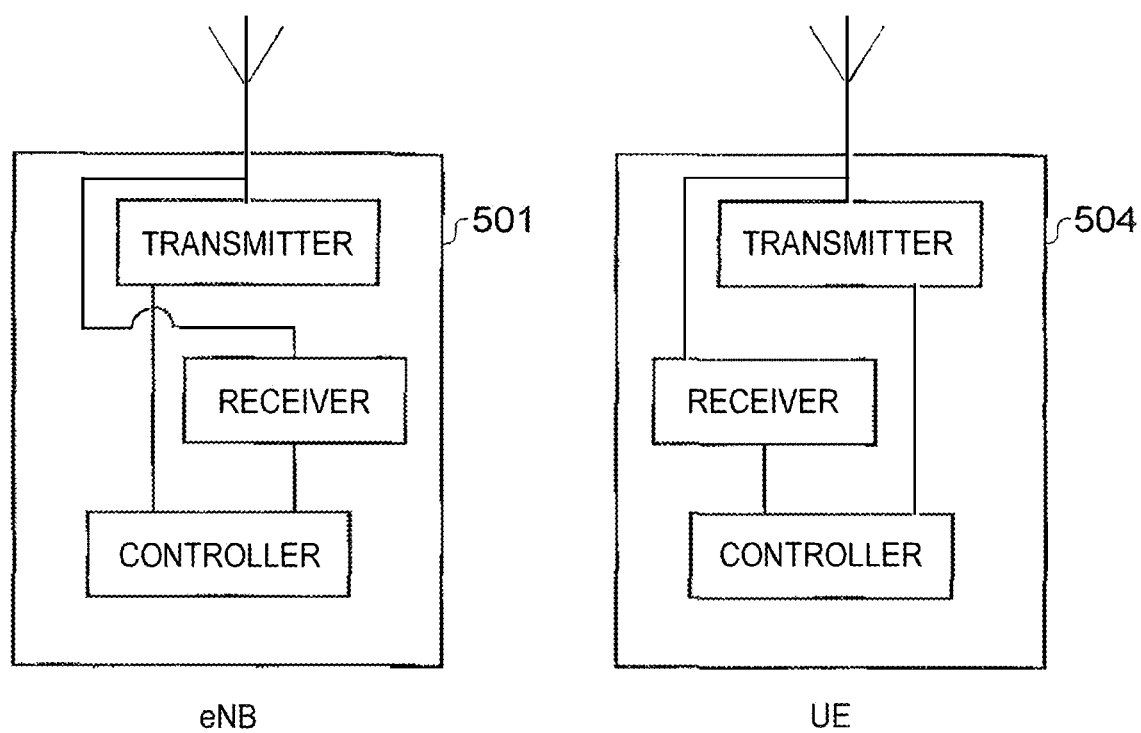
FIG. 7 is a schematic block diagram of an example base station (eNodeB) and communications device (UE)

As shown in FIG. 7, the eNodeB 501 is shown in accordance with a simplified representation to include a transmitter 701, a receiver 702 and a controller 704. The transmitter 701 and receiver 702 are configured to operate in accordance with the LTE Standard to transmit and receive signals via a wireless access interface. The controller 704 is representative of a scheduler or other controller which controls the use of communications resources to form the wireless access interface in accordance with the LTE Standard. However as will be explained shortly the controller 704 may also determine from measurements received from the UE 504 the interference present within the LTE-U band, identifies candidates carriers, forms the candidate channels into a nested carrier and transmits signalling messages in accordance with a radio resource control layer (RRC) to the UE 504 so that the UE 504 can transmit or receive signals via the LTE-U band. Correspondingly, therefore the UE 504 includes a transmitter 710, a receiver 712 and a controller 714.

Figure 8A:
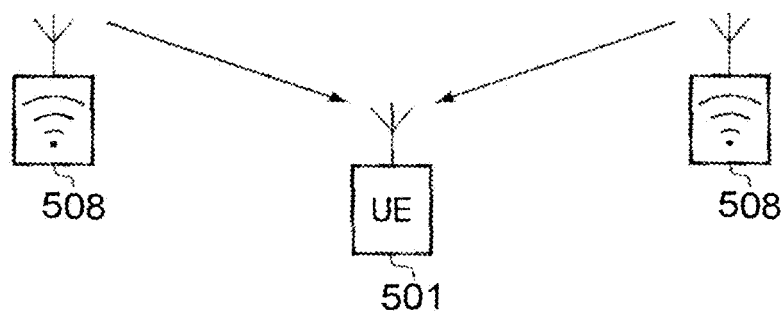
FIG. 8a is a schematic illustration of communications devices operating in accordance with the present technique to determine interfering signals present in an unlicensed frequency band.
Figure 8B:
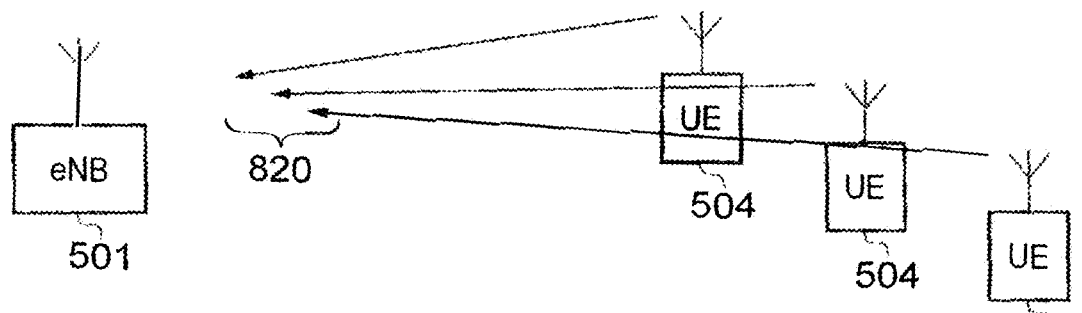
FIG. 8b is a schematic illustration of communications devices operating to report interference measurements of interfering signals present in an unlicensed frequency band.
Figure 8C:
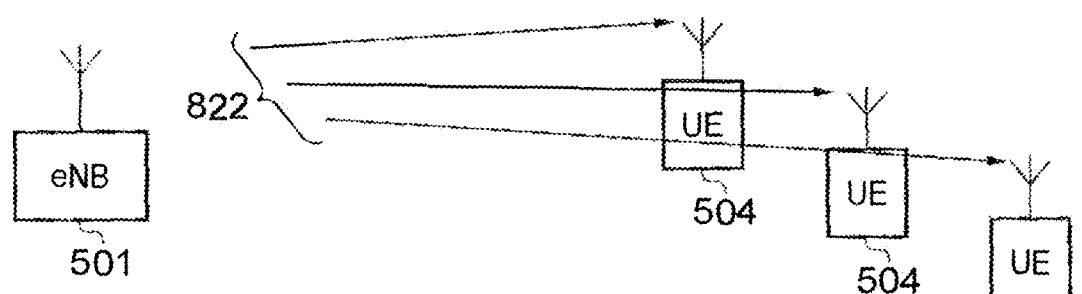
FIG. 8c is a schematic illustration of a base station (eNodeB) transmitting signalling messages informing the communications devices of the one or more candidate channels which make up a nested carrier to form a secondary cell in the unlicensed frequency band.
Figure 8D:
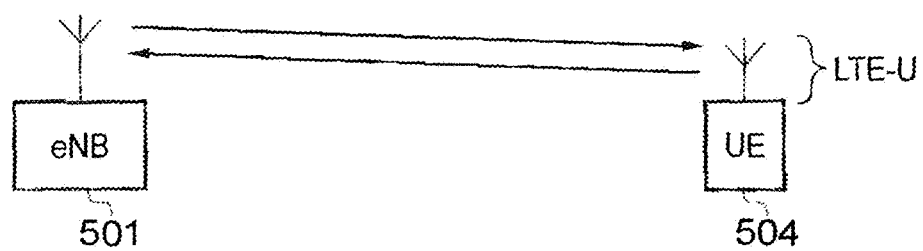
FIG. 8d is a schematic illustration of a communications device transmitting and receiving signals to and from the base station using the unlicensed frequency band.

In accordance with the present technique the UE first detects interference signals caused for example by the wireless access points 508 shown in FIG. 5. This is represented in FIG. 8*a*. In FIG. 8*a* arrows 801 represent signals detected by the UE 504 transmitted by the wireless access points 508. A measurement report depending on for example the signal strength of the interfering signals and the frequency and/or the time of those interfering signals is then transmitted by the UEs 504 to the eNodeB 501 as represented by arrows 820 shown in FIG. 8*b*.

The eNodeB 501 then determines the candidate channels suitable for forming into a nested carrier within the LTE-U band based on the measurements received from the UEs 504. The eNodeB 501 then transmits signalling messages represented by arrows 822 to the UEs 504. For example the signalling messages may be transmitted as part of the RRC set up protocol of the LTE Standard. However, the signalling messages 820 are transmitted via the LTE-A band that is the primary cell formed by the eNodeB 501. Finally FIG. 8*d*, the eNodeB 501 can transmit and/or receive data in the LTE-U band to or from a user equipment 504, via a wireless access interface as would be the case for the LTE-A band. As will be explained in the following examples, in some examples the LTE-U band is only used for transmitting or receiving signals representing data whereas control or signalling messages are sent by the LTE-A or primary cell.

Formation of a Nested Carrier

In accordance with the present technique the eNodeB 501 configures candidate channels into nested carrier(s).

For the example of LTE systems, it is known for LTE systems after release-10 to aggregate multiple 'component carriers'. Carrier Aggregation is described in further detail in 3GPP specifications TS 36.211, 36.212, 36.213, 36.321, 36.331. Principal motivations for this include increased peak data rate requirements in Rel-10 demanding bandwidth beyond the 20 MHz maximum available in Rel-8/9 and to enable more efficient and productive use of fragmented spectrum. Up to five component carriers, not necessarily contiguous with one another, and each of any permitted LTE system bandwidth can be aggregated for each of down-link and up-link, allowing a maximum total bandwidth of 100 MHz.

In accordance with carrier aggregation terminology a cell is called a 'primary cell' or Primary cell or Pcell if it is a cell that is initially configured during connection setup. It has a down-link component carrier and an up-link component carrier (a component carrier can be referred to as a 'CoC'). A cell configured after connection establishment is termed a 'secondary cell' or Secondary cell or Scell. Since up to five component carriers can be aggregated according to 3GPP LTE Release 10 specifications, up to four Secondary cells can be configured. A Secondary cell need not have both a down-link and an up-link component carrier. The permitted combinations of down-link and up-link component carriers in Primary cell and Secondary cells are focussed on having at least as many down-link components as up-link components (in which case, to every uplink there is a downlink), but other possibilities are permitted and increase in scope in later Releases. The association between up-link component carriers and down-link component carriers is signalled in SIB2 on each down-link component carrier. The eNodeB controls activation and de-activation of Secondary cells by sending MAC messages to the UE, or a Secondary cell may 'time-out' if no PDCCH is received before a related timer expires.

Physical Layer Control Channels

Each down-link component carrier has the normal LTE control channels: (E)PDCCH, PCFICH and PHICH. However, carrier aggregation introduces the possibility of cross-carrier scheduling on PDCCH. In this case, the downlink control information (DCI) message on PDCCH includes a carrier indicator field (CIF) of three bits which indicates which carrier the PDCCH message applies to. If there is no CIF, then the PDCCH applies to the carrier on which it is received. Cross carrier scheduling is motivated principally in a heterogeneous network (het-net) scenario where over-laid macro and small cells operate carrier aggregation in the same band. Interference between macro and small cell PDCCH can be mitigated by arranging that the macro use CoC1 at high power to provide coverage, and CoC2 at low power to provide high rate to nearby UEs and avoid interfering with the small cell. The small cell uses both component carriers at low power to avoid interference to the macro. Control channel interference from macro to small cell on CoC1 means that it is beneficial for the small cell to use PDCCH on CoC2 to schedule its UEs on CoC1.

The control region may differ in size between component carriers, so they can carry different PCFICH values. However, the potential hetnet interference in the control region (see above example) may mean that PCFICH cannot be decoded on a particular component carrier. Therefore, Rel-10 allows for each component carrier a semi-static indication of which OFDM symbol PDSCH can be assumed to begin. If a shorter region is actually used, then the free OFDM symbols can be used for transmission to UEs which are not being cross-scheduled since they will decode the actual PCFICH, and if a longer region is used, the eNodeB must tolerate some degradation in performance of the cross-scheduled UEs, but this is an operator choice.

PHICH is sent on the same down-link component carrier as sent the PDCCH containing the PUSCH which triggered PHICH. So one down-link component carrier may carry PHICH for more than one component carrier.

In the uplink, the basic operation of PUCCH is not altered. A new PUCCH format 3 is introduced to support the sending of ACK/NACK for the multiple down-link component carriers, with some alterations to format 1b to increase the number of ACK/NACK bits it can carry.

To allow good up-link channel sounding, SRS can be configured on any serving cell. There are rules regarding the interaction of PUSCH, PUCCH and SRS across multiple cells to ensure priority of the various transmissions is achieved.

Initial Configurations

PSS and SSS are transmitted on all component carriers using the same physical-layer cell identity (PCI), and component carriers are all synchronised (they are from the same eNodeB). This is to allow cell search and discovery. Matters such as security and system information (SI) are handled by Primary cell. In particular, when activating an Secondary cell, the Primary cell delivers all the required SI for the Secondary cell to the UE via dedicated RRC signalling. If Secondary cell SI changes, the Secondary cell is released and re-added by Primary cell RRC signalling (in one RRC message). Primary cell changes due to, e.g. long-term fluctuations in channel quality across bandwidth are handled by an amended handover procedure. The source Primary cell passes all the carrier aggregation information over to the target Primary cell and so the HE can begin to use all the assigned component carriers as soon as handover is complete.

Random Access always occurs on the up-link component carrier of Primary cell, except that the final stage of the contention resolution message can be cross carrier scheduled onto another serving cell.

Figure 9:
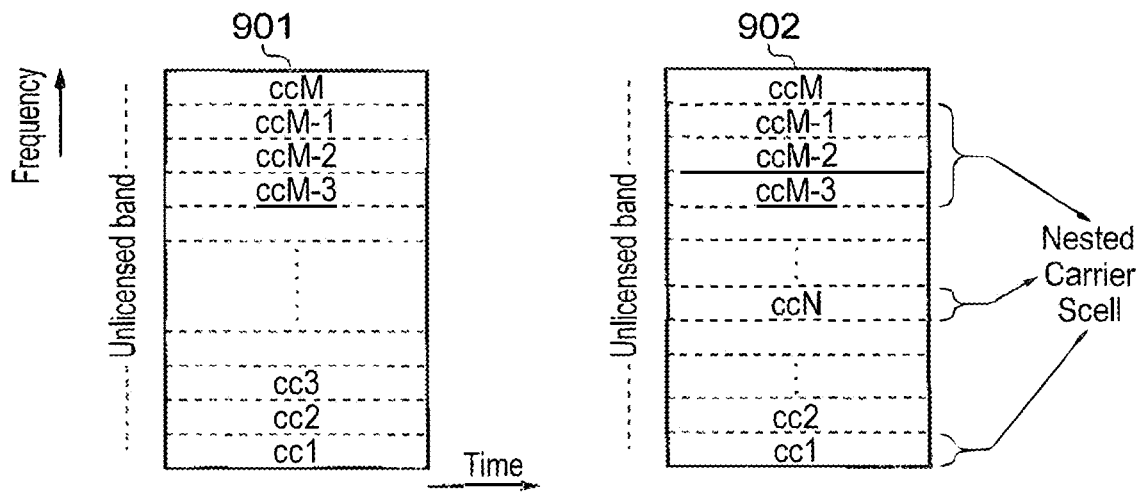
FIG. 9 is a schematic illustration of a deployment of candidate channels within an unlicensed frequency band, which are aggregated into a nested carrier.

FIG. 9 represents a formation of candidate channels within the U-resources and the logical aggregation of some of the candidate channels into a nested carrier. As shown in FIG. 9, the eNodeB 501 first identifies which candidate channels 901 are suitable within the unlicensed band and then identifies a nested carriers which can be combined to form an aggregated nested carrier as shown in the shaded section of the identified candidate channels in the frequency and time deployment 902.

Logical Aggregation into Nested Carriers

Having received measurement information from the U-UE regarding candidate channels, the eNodeB then determines how many and/or which candidate channels are suitable for allocation to the U-UE. The eNodeB signals these candidate channels to the U-UE via RRC. However, rather than being treated as a set of individual carriers to be aggregated with the Primary cell, the candidate channels together are logically aggregated into a single LTE carrier nested within the U-resources. This 'nested carrier' is then treated as a Secondary cell in carrier aggregation with the LTE-A Primary cell, and is not treated by eNodeB or UE as a set of independent candidate channels any further. The normal operation of CA applies between the LTE-A Primary cell and the LTE-U nested carrier Secondary cell. In particular, control signalling on (E)PDCCH can be on Primary cell and Secondary cell, or it could be on Primary cell only with cross-carrier scheduling.

In one example, the candidate channels logically aggregated into the nested carrier need not be adjacent to one another. The logical aggregation occurs at baseband for processing in the HE rather than at RF, and the actual carrier aggregation is between the nested carrier and Primary cell as usual. In one example, the nested carrier consists of only one candidate channel and so a constraint that each candidate channel be of a valid LTE system bandwidth is useful.

A nested carrier can be re-configured according to further measurement feedback received from the U-UE. Thus, a candidate channel or candidate channels may be removed from the nested carrier and/or other candidate channels added to it, meaning that both the candidate channels and the bandwidth of the nested carrier can change over time. Typically, the composition of an nested carrier is expected to be semi-static, i.e. signalled by RRC and changing only slowly. The candidate channels comprising an nested carrier are expected to usually be static for the duration of the validity of the measurement that was used to establish it. However, in general, the usual LTE resource allocation methods can be used, including an indication of a hopping pattern among the candidate channels which could be indicated from among a pre-defined set of such patterns or in detail on e.g. a sub-frame basis or radio frame basis or a general periodic or aperiodic basis. Such a method could be useful in cases where no good measurements are available, but it may tend to disrupt the other wireless systems operating in the U-resources more than a non-hopped configuration. The RRC configuration in the case of non-hopped candidate channels might indicate precisely which candidate channels are to be used, for example using a combinatorial index approach such as already known in CQI reporting in LTE, or it could use a bitmap per candidate channel, or it could provide an index into a table of possible candidate channel combinations (which might contain less than all possibilities).

For the purpose of generality, note that, in principle, the nested carrier composition from candidate channels could alternatively be signalled dynamically on (E)PDCCH on the configuring cell.

In general, there could be more than one nested carrier Secondary cell configured for a U-UE if the U-resources are sufficient and of good enough quality. These would operate in multiple-CA with the Primary cell.

SUMMARY

Using candidate channels and nested carriers allows LTE to be deployed in unlicensed bands where it would not currently be suitable to do so due to the lack of a contiguous bandwidth of resources having suitable unlicensed interference characteristics. This is due to the high interference levels that would be experienced in some parts of the unlicensed band from other wireless transmission and their characteristic of varying unpredictably over time and frequency. Thus LTE in fragmented bandwidth becomes possible by allowing higher-throughput services to be offered than would be possible in any or most of the unstructured unlicensed resources thanks to being able to simultaneously (i) avoid heavy unlicensed interference and (ii) aggregate non-contiguous radio resources according to a more flexible granularity than is currently possible.

Candidate channels and nested carriers are a better solution that extending resource allocations in Primary cell DCI messages to provide e.g. bitmaps sized to address the entire U-resources. This would increase (E)PDCCH load in Primary cell, or a cross-scheduling Secondary cell. However, resource allocations for the nested carrier can be sized semi-statically according to a currently-configured baseband bandwidth of the nested carrier, saving control resources and thus generally improving cell throughput.

Physical Control Channels

Figure 10:
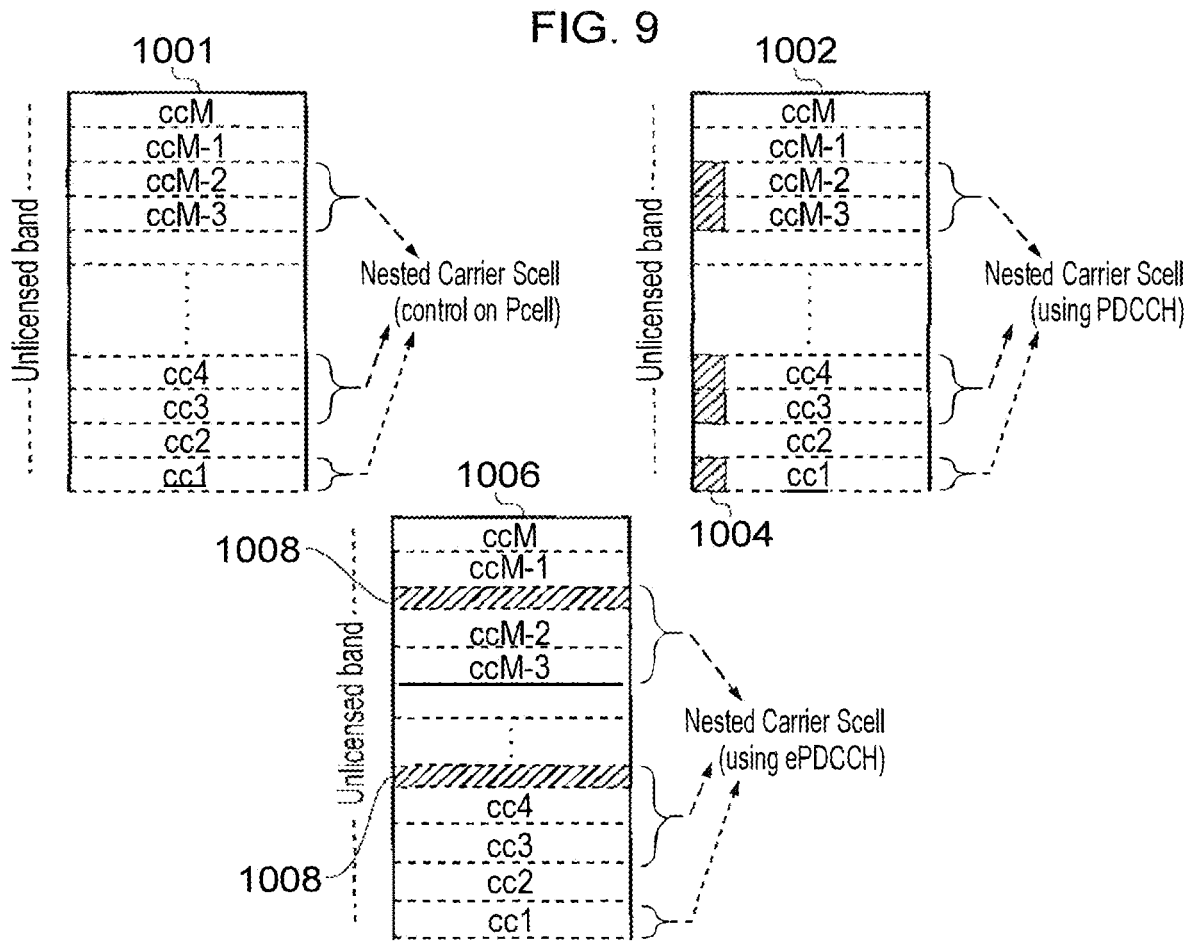
FIG. 10 is a schematic illustration of example deployments of a nested carrier which, includes possible down-link control channels within an unlicensed frequency band.

FIG. 10 provides an example in which the nested carrier is arranged to include not only communications resources allocated for the transmission of data or reception of data but also the presence of a downlink control channel which may be a conventional PDCCH or an enhanced PDCCH (EPDCCH). Thus as shown in a timing-frequency block 1001 only the candidate channels which have been logically aggregated to form a nested carrier to for the secondary cell are used for transmitting data. However, in the example of the timing frequency block 1002 a section of the resources to the left of the block shown with a dark shading 1004 are used to form a PDCCH. However this is over a non-contiguous set of frequencies. In contrast a time and frequency block 1006 shows an example in which the dark shading represents an PDCCH where the frequency is divided into a section which extends over the entire sub frame 1008.

As illustrated by the PDCCH example, the PDCCH is split across the multiple candidate channels, and not across the entire span of RF bandwidth. This operation is different to normal PDCCH operation, but can be successful because the candidate channels are logically aggregated into the nested carrier at baseband by the UE. The EPDCCH example shows multiple EPDCCH regions within the nested carrier. These could contain distributed or localised EPDCCH(s), since a localised EPDCCH is not necessarily in contiguous resources. Each ECCE is confined to one PRB. It is not necessary that the EPDCCH-PRB-pairs which are indicated are each wholly within one candidate channel, as the aggregation into the nested carrier could produce an appropriate bandwidth of one PRB.

The candidate channel configurations for different UEs (see further below) may incorporate some of the same PRBs. This is resolved by the eNodeB scheduler as normal for PDSCH shared resource management. The existence of candidate channels and nested carriers does not represent a significant increase in scheduler complexity at the eNodeB beyond that for ordinary carrier aggregation, because the U-resources can be treated as the one continuous resource that they in fact are.

Figure 11:
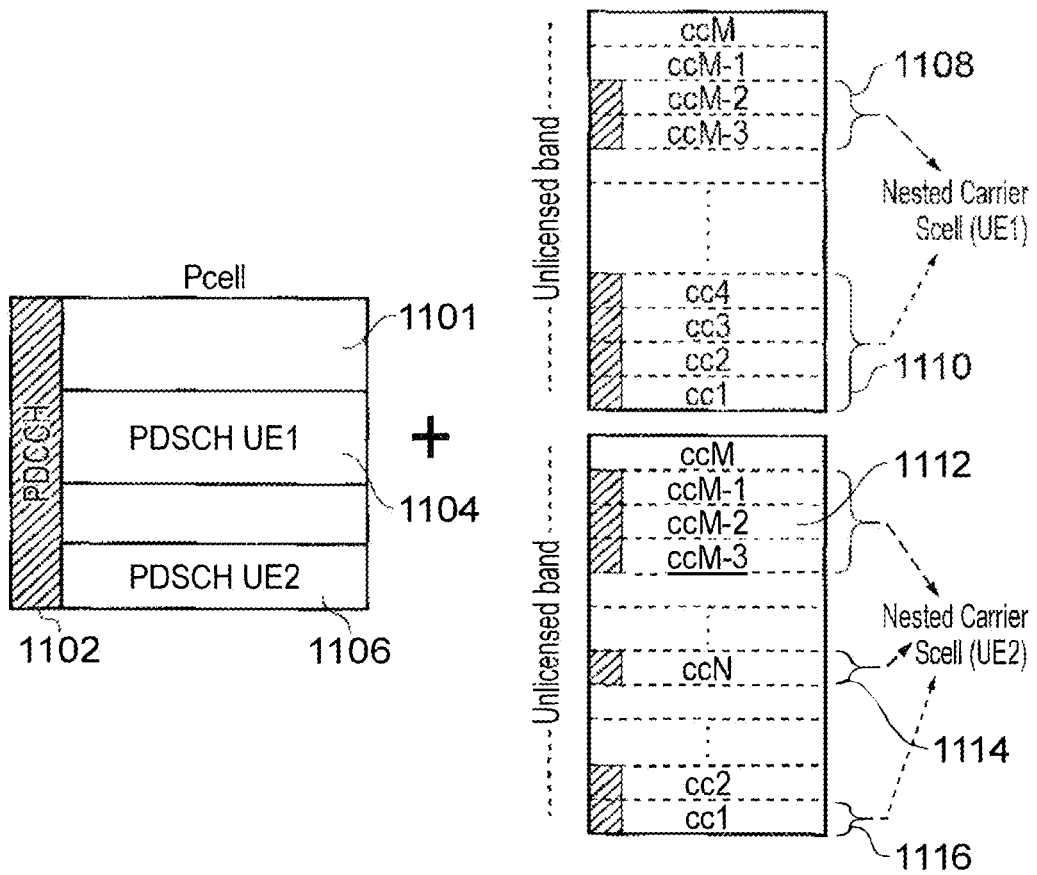
FIG. 11 is a schematic illustration of an example deployment of nested carriers providing secondary cells with different sets of one or more candidate channels for different communications devices, the so-formed secondary cells combined with a primary cell in a licensed frequency band.

A further example is shown in FIG. 11 in which the downlink time frequency resources of the primary cell is shown 1101 to include a PDCCH 1102 as well as two PDSCH's allocated to two separate UE's 1104, 1106. In addition, different Secondary cells provided by different nested carriers formed from candidate channels in the Uresources are allocated to UE one 1108, 1110 and the second UE two 1112, 1114, 1116.

Nested Carriers and Spatial Re-Use of Candidate Channels

Figure 12:
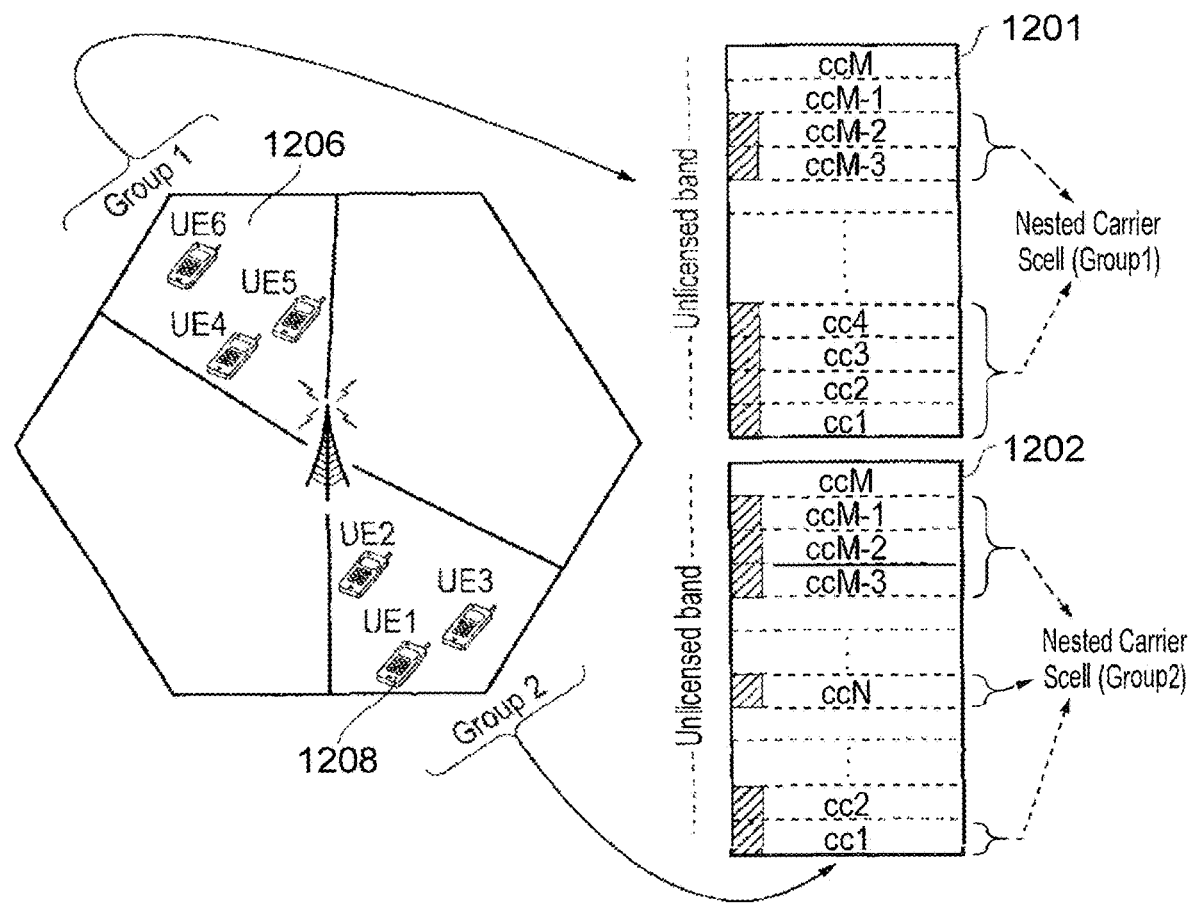
FIG. 12 is a schematic illustration of a deployment of different sets of one or more candidate channels forming a nested carrier for different parts of a physical cell according to an example embodiment of the present technique.

FIG. 12 provides a further illustration in which different sections of a cell can be allocated differently in dependence upon interference present. Thus the presence of difference interference can result in different parts on the cell having different candidate channels at different frequencies. Two time and frequency blocks 1201, 1202 are shown in which the candidate channels differ between these blocks for different parts of the cell. Thus a group 1 represents candidate channels in the time and frequency block of the unlicensed band in a first part 1206 of the cell whereas the time and frequency resource block 1202 provide different candidate channels in a second part of the cell 1208. This arrangement is provided because interference conditions in U-resources can change unpredictably over space, owing for example to interference arriving at one edge of a cell that is not received by U-UEs operating at the opposite edge. Therefore, different U-UEs can in general have their nested carriers comprised of different candidate channels. However, all the U-UEs within the macrocell have aggregation with the same Primary cell. Therefore, operation in U-resources according to the invention has the characteristic of:

A common Primary cell for all U-UEs; aggregated with UE-specific nested carrier Secondary cells Interference conditions in a sufficiently small geographical area $G_1$ within the macro cell are sufficiently similar that the eNodeB may decide to configure the same candidate channels to comprise several U-UE's nested carriers within $G_1$. U-UEs in another small geographical area $G_2$, far from $G_1$, experience different conditions to $G_1$ but which are sufficiently similar within $G_2$ that the eNodeB decides to configure candidate channels common to U-UEs in $G_2$, but which are at least in part different to those used in $G_1$. In this way, there can be spatial re-use of the U-resources within the macrocell. It also amounts to logical re-use of nested carriers if the eNodeB configures the same candidate channels for U-UEs within $G_1$ and $G_2$.

Broadcast and Multicast

In the case that multiple U-UEs share a common nested carrier, there is the option to transfer some of the Primary cell's broadcast control signalling to the nested carrier Secondary cell. This would improve coverage of the broadcast control transmissions from the eNodeB by reducing propagation distance to the U-UEs. This could be enabled via a Primary cell RRC configuration indicating the U-UE can expect to receive common search-space (E)PDCCHs on Secondary cell, allowing the U-UEs to check for (E)PDCCH with CRC scrambled by the relevant RNTI(s). There could be the further advantage of allowing common EPDCCH to benefit from FDM interference coordination between Primary cell and Secondary cell.

U-UEs would by implementation still have the option of trying also to decode the Primary cell broadcast control messages.

PMCH (i.e. eMBMS) could also be off-loaded to the nested carrier Secondary cell for groups of U-UEs with a common nested carrier. Like PDCCH, the frequency-split nature of this would be a departure from current PMCH operation—PMCH is wideband—but the logical aggregation at baseband allows this work unchanged. Potentially, if all eMBMS UEs are U-UEs which can be arranged into groups, each group of U-UEs having a common nested carrier within the group, then PMCH can be off-loaded per common Secondary cell, and the Primary cell may have no need to transmit PMCH itself, improving Primary cell PDSCH resource capacity. Nested carrier operation thereby can provide a mixture between unicast, multicast and broadcast use of U-resources.

The present technique can provide an arrangement in which:

Arbitrary resources are aggregated into an LTE carrier—at present a carrier is defined on whole bands of resource, and is not dynamically created within a bandwidth from only a subset of the bandwidth, following measurement and feedback.

At present, the Secondary cell and Primary cell would each be common to all UEs operating under the same eNodeB. In the invention, different UEs can have different Secondary cells. Effectively, Secondary cells have become dedicated to a single UE in the general form of the invention.

Since Secondary cells in the invention can be dedicated, common (E)PDCCH can be sent via Secondary cell instead of Primary cell, improving (E)PDCCH coverage.

PDCCH is at present in continuous bandwidth, but in the invention is comprised from resources which are only logically continuous and in RF terms are discontinuous.

Various further aspects and features of the present technique are defined in the appended claims. The following numbered clauses provide further example aspects:

1. A communications device for transmitting data to or receiving data from a mobile communications network, the mobile communications network including infrastructure equipment, the infrastructure equipment providing a wireless access interface for transmitting signals to or receiving signals from the communications device, the communications device comprising:

a transmitter configured to transmit the signals to the infrastructure equipment via the wireless access interface, a receiver configured to receive the signals from the infrastructure equipment via the wireless access interface, and a controller for controlling the transmitter and the receiver to receive data transmitted to the communications device from the infrastructure equipment via the wireless access interface, the wireless access interface providing a primary carrier within a first frequency range, which forms a primary cell providing a contiguous set of communications resources across the first frequency range and providing one or more control channels for transmitting signaling message to the communications device or receiving signaling messages from the infrastructure equipment, wherein the controller is configured in combination with the receiver and transmitter to receive from the infrastructure equipment a signaling message identifying a nested carrier comprising one or more candidate channels selected from a predefined plurality of candidate channels within a second frequency range which is different to and mutually exclusive from the first frequency range, each of the one or more selected candidate channels representing a minimum unit of communications resource which can be used to transmit data via the up-link or to receive data on the downlink, the one or more selected candidate channels in the second frequency range being formed by the infrastructure equipment into the nested carrier for providing a secondary cell, and the signaling message being transmitted from the infrastructure equipment via the control channel of the first frequency range, and to receive from the infrastructure equipment at least a part of the data or to transmit to the infrastructure equipment at least a part of the data within the nested carrier.

2. A communications device according to clause 1, wherein the controller is configured in combination with the receiver to determine an amount of interference present at frequencies within the second frequency range, and to control the transmitter to transmit an indication of the determined interference signals present in the second frequency range to the infrastructure equipment, the infrastructure equipment being configured in response to receipt of the indication of the determined interference signals to select the one or more candidate channels from the predefined plurality of candidate channels in the second frequency range depending on the determined interference signals present in the second frequency range, the one or more selected candidate carriers being arranged by the infrastructure equipment to form the nested carrier in the second frequency range.

3. A communications device according to clause 1 or 2, wherein the controller is configured in combination with the receiver to receive signals representing the data transmitted by the infrastructure equipment from the communications resources provided from the nested carrier of the second frequency range and the communications resources of the first frequency range.

4. A communications device according to clause 1, 2 or 3, wherein one or more selected candidate channels of the nested carrier are not adjacent within the second frequency range.

5. A communications device according to any of clauses 1 to 4, wherein the controller is configured in combination with the receiver to receive a second signaling message from the control channel of the first frequency range, the second signaling message providing an indication of a change in the one or more candidate channels which have been selected from the predefined plurality of candidate channels which form the nested carrier within the second frequency range and providing an indication of a change to the candidate channels forming the nested carrier, and to receive the signals representing the data from the nested carrier comprising the newly selected one or more candidate channels.

6. A communications device according to any preceding clause, wherein the infrastructure equipment is configured to adapt the nested carrier to include a control channel and a shared channel providing shared communications resources for allocation to the communications device for transmitting signals to or receiving signals from the infrastructure equipment, and the controller in combination with the receiver is configured to receive a third signaling message providing an allocation of communications resources to the communications device within the shared channel.

7. A communications device according to any preceding clause, wherein the controller is configured in combination with the transmitter to transmit the data via the wireless access interface using the first frequency range of the primary cell and using the nested carrier of the second frequency range forming the secondary cell, or to receive the data via the wireless access interface from the first frequency range of the primary cell and from the nested carrier of the second frequency range forming the secondary cell.

8. A communications device according to any preceding clause, wherein the minimum resource allocation of the candidate channel comprises a segment of communications resource comprising one sub-carrier.

9. A communications device according to any preceding clause, wherein the minimum resource allocation of the candidate channel comprises a segment of communications resource comprising in frequency at least one physical resource block (PRB) of a wireless access interface operating in accordance with a Long Term Evolution standard.

10. A communications device according to clause 9, wherein the minimum resource allocation of the candidate channel comprises in frequency a segment of communications resource of six physical resource blocks of a wireless access interface operating in accordance with a Long Term Evolution standard.

11. A communications device according to any preceding clause, wherein the minimum resource allocation of the candidate channel comprises a segment of communications resource comprising twelve Orthogonal Frequency Division Multiplexing sub-carriers.

12. A communications device according to clause 7, wherein each candidate channel is of a baseband bandwidth suitable for use as a carrier of a wireless access interface operating in accordance with a Long Term Evolution standard.

13. A method of transmitting data to a mobile communications network from a communications device or receiving data from a mobile communications network at a communications device, the mobile communications network including an infrastructure equipment, the method comprising transmitting signals representing the data from the communications device to the infrastructure equipment via a wireless access interface provided by the infrastructure equipment, receiving signals representing the data at the communications device from the infrastructure equipment via the wireless access interface, and controlling the transmitting or the receiving the signals to transmit the data to the mobile communications network or to receive data from the mobile communications network via the wireless access interface, the wireless access interface providing a primary carrier within a first frequency range, which forms a primary cell providing a contiguous set of communications resources across the first frequency range and providing one or more control channels for transmitting signaling message to the communications device or receiving signaling messages from the infrastructure equipment, wherein the controlling the transmitting the signals or receiving the signals comprises receiving from the infrastructure equipment a signaling message identifying a nested carrier comprising one or more candidate channels selected from a predefined plurality of candidate channels within a second frequency range which is different to and mutually exclusive from the first frequency range, each of the one or more selected candidate channels representing a minimum unit of communications resource which can be used to transmit data via the up-link or to receive data on the downlink, the one or more selected candidate channels in the second frequency range being formed by the infrastructure equipment into the nested carrier for providing a secondary cell, and the signaling message being transmitted from the infrastructure equipment via the control channel of the first frequency range, and receiving from the infrastructure equipment at least a part of the data from the nested carrier, or transmitting to the infrastructure equipment at least a part of the data within the nested carrier.

14. An infrastructure equipment forming part of a mobile communications network for transmitting data to or receiving data from communications devices, the infrastructure equipment comprising a transmitter configured to transmit the signals to communications devices via a wireless access interface, a receiver configured to receive the signals from the communications devices via the wireless access interface, and a controller for controlling the transmitter and the receiver to form the wireless access interface for transmitting to the communications devices and receiving the data from the communications devices, the wireless access interface providing a first primary carrier within a first frequency range, which forms a primary cell providing a contiguous set of communications resources across the first frequency range and providing one or more control channels for transmitting signaling message to the communications device, wherein the controller is configured in combination with the receiver and transmitter to transmit to one or more of the communications devices a signaling message identifying a nested carrier comprising one or more candidate channels selected from a predefined plurality of candidate channels within a second frequency range which is different to and mutually exclusive from the first frequency range, each of the one or more selected candidate channels representing a minimum unit of communications resource which can be used to transmit data via the up-link or to receive data on the downlink, the signaling message being transmitted from the network element via the control channel of the first frequency range, to receive from the communications device at least a part of the data from the nested carrier, or to transmit to the communications device at least a part of the data within the nested carrier.

15. An infrastructure equipment according to clause 14, wherein the controller is configured in combination with the transmitter and the receiver to receive from one or more communications devices an indication of a relative level of interfering signals being transmitted at frequencies in the second frequency range, to select the one or more candidate channels from the predefined plurality of candidate channels in the second frequency range depending on the determined interference signals present in the second frequency range, and to form the one or more selected candidate channels into a nested carrier for providing the secondary cell, the nested carrier providing a logical grouping of communications resource for allocation to the one or more communications devices.

16. An infrastructure equipment according to clause 15, wherein the controller is configured in combination with the transmitter and the receiver to determine from the one or more communications devices an indication of a relative location of the communications devices from which the indication of the relative interfering signals was received, to combine the indication of the relative interfering signals from each of the communications devices with the relative location of the communications devices, to identify a relative location of the interfering signal within a geographical coverage area provided by the infrastructure equipment, to form the nested carrier as a first nested carrier and a second nested carrier with a different configuration of one or more candidate channels from the first nested carrier depending on the relative location of the interfering signals, to transmit to a first of the one or more communications devices a first version of the signaling message providing a first set of one or more of the candidate carriers selected from the predefined plurality of candidate channels for the first nested carrier, and to transmit to a second of the one or more communications devices a second version of the signaling message providing a second set of one or more of the candidate carriers selected from the predefined plurality of candidate channels for the second nested carrier, wherein the first communications device is located in a different area to the second communications device, the first set of the one or more selected candidate carriers being matched to a first set of interfering signals in a first area in which the first communications device is located and the second set of the one or more selected candidate carriers being matched to a second set of interfering signals in a second area in which the second communications device is located.

17. An infrastructure equipment according to clause 14 or 15, wherein the controller is configured in combination with the transmitter and the receiver to receive at predetermined times from the one or more communications devices the indication of the relative level of interfering signals being transmitted at each of the different frequencies in the second frequency range, to select the one or more candidate channels from the predefined plurality of candidate channels in the second frequency range depending on the frequency within the second frequency range at which the interfering signals are being transmitted, to form the nested carrier from the one or more selected candidate channels for providing the secondary cell, and to transmit a further version of the signaling message to the one or more communications devices providing an up-dated indication of the one or more selected candidate channels of the nested carrier.

18. An infrastructure equipment according to clause 17, wherein the controller is configured in combination with the transmitter and the receiver to determine whether the one or more selected candidate channels has changed with respect to the one or more selected candidate channels of the nested carrier which has been identified by the signaling message transmitted to the one or more communications devices, and if the one or more selected candidate channels of the nested carrier has changed, to transmit the further version of the signaling message to the one or more communications devices providing the up-dated indication of the identified one or more selected candidate channels of the nested carrier.

19. An infrastructure equipment according to any of clauses 15 to 18, wherein the controller is configured in combination with the transmitter and the receiver
to receive from one or more communications devices the indication of the relative level of interfering signals being transmitted at frequencies in the second frequency range with an indication of the relative time of transmission of the interfering signals,
to select the one or more candidate channels from the predefined plurality of candidate channels in the second frequency range depending on the frequency within the second frequency range at which the interfering signals are being transmitted and a time of transmission of the interfering signals, and
to form the nested carrier from the one or more selected candidate channels for providing the secondary cell, with respect to the interfering signals and the time of transmission of the interfering signals.

20. An infrastructure equipment according to any of clauses 15 to 18, wherein one or more selected candidate channels of the nested carrier are not adjacent within the second frequency range.

21. An infrastructure equipment according to any clauses 15 to 20, wherein the controller is configured in combination with the transmitter and the receiver
to adapt the nested carrier to include a control channel and a shared channel providing shared communications resources for allocation to the communications device for transmitting signals to or receiving signals from the infrastructure equipment, and
to transmit a second signaling message providing an allocation of communications resources to the communications device within the shared channel.

22. An infrastructure equipment according to any of clauses 15 to 21, wherein the controller is configured in combination with the transmitter and the receiver
to transmit the data via the wireless access interface using the first frequency range of the primary cell and using the nested carrier of the second frequency range forming the secondary cell, or
to receive the data via the wireless access interface from the first frequency range of the primary cell and from the nested carrier of the second frequency range forming the secondary cell.

23. An infrastructure equipment according to any of clauses 15 to 22, wherein the minimum resource allocation of the candidate channel comprises a segment of communications resource comprising one sub-carrier.

24. An infrastructure equipment according to any of clauses 15 to 22, wherein the minimum resource allocation of the candidate channel comprises a segment of communications resource comprising in frequency at least one physical resource block (PRB) of a wireless access interface operating in accordance with a Long Term Evolution standard.

25. An infrastructure equipment according to any of clauses 15 to 22, wherein the minimum resource allocation of the candidate channel comprises in frequency a segment of communications resource of six physical resource blocks of a wireless access interface operating in accordance with a Long Term Evolution standard.

26. An infrastructure equipment according to any of clauses 15 to 22, wherein the minimum resource allocation of the candidate channel comprises a segment of communications resource comprising twelve Orthogonal Frequency Division Multiplexing sub-carriers.

27. An infrastructure equipment according to any of clauses 15 to 22, wherein each candidate channel is of a baseband bandwidth suitable for use as a carrier of a wireless access interface operating in accordance with a Long Term Evolution standard.

28. A method of transmitting data to or receiving data from communications devices, the method comprising
transmitting the signals to communications devices via a wireless access interface,
receiving the signals from the communications devices via the wireless access interface, and
controlling the transmitter and the receiver to form the wireless access interface for transmitting to the communications devices and receiving the data from the communications devices, the wireless access interface providing a first primary carrier within a first frequency range, which forms a primary cell providing a contiguous set of communications resources across the first frequency range and providing one or more control channels for transmitting signaling message to the communications device, wherein the controlling the transmitting and the receiving comprises
transmitting to one or more of the communications devices a signaling message identifying a nested carrier comprising one or more candidate channels selected from a predefined plurality of candidate channels within a second frequency range which is different to and mutually exclusive from the first frequency range, each of the one or more selected candidate channels representing a minimum unit of communications resource which can be used to transmit data via the up-link or to receive data on the downlink, the signaling message being transmitted from the network element via the control channel of the first frequency range,
receiving from the communications device at least a part of the data from the nested carrier, or
transmitting to the communications device at least a part of the data within the nested carrier.

The invention claimed is:

1. A communications device for transmitting data to or receiving data from a mobile communications network providing a wireless access interface for transmitting signals to or receiving signals from the communications device, the communications device comprising:
 a transmitter configured to transmit the signals to the mobile communications network via the wireless access interface,
 a receiver configured to receive the signals from the mobile communications network via the wireless access interface, and
 a controller for controlling the transmitter and the receiver
  to receive data transmitted to the communications device from the mobile communications network via the wireless access interface, the wireless access interface providing a primary carrier within a first frequency range, which forms a primary cell providing a contiguous set of communications resources across the first frequency range and providing one or more control channels for transmitting signaling messages to the communications device or receiving signaling messages from the mobile communications network, wherein the controller is configured in combination with the receiver and transmitter
  to receive from the mobile communications network a signaling message identifying a nested carrier comprising one or more candidate channels selected from a plurality of candidate channels within a second frequency range in an unlicensed frequency band which is different to and mutually exclusive from the first frequency range, the plurality of candidate channels being predefined and determined without configuration signaling by the wireless access interface, each of the one or more selected candidate channels representing a minimum unit of communications resource which can be used to transmit data via the up-link or to receive data on the downlink, the one or more selected candidate channels in the second frequency range being formed into the nested carrier for providing a secondary cell, and the signaling message being transmitted from the mobile communications network via the control channel of the first frequency range, and to receive from the mobile communications network at least a part of the data or to Transmit to the mobile communications network at least a part of the data within the nested carrier.

2. The communications device according to claim 1, wherein the controller is configured in combination with the receiver
  to determine an amount of interference present at frequencies within the second frequency range, and to control the transmitter to transmit an indication of the determined interference signals present in the second frequency range to the mobile communications network, the mobile communications network being configured in response to receipt of the indication of the determined interference signals to select the one or more candidate channels from the predefined plurality of candidate channels in the second frequency range depending on the determined interference signals present in the second frequency range, the one or more selected candidate carriers being arranged to form the nested carrier in the second frequency range.

3. The communications device according to claim 1, wherein the controller is configured in combination with the receiver
  to receive signals representing the data transmitted by the mobile communications network from the communications resources provided from the nested carrier of the second frequency range and the communications resources of the first frequency range.

4. The communications device according to claim 1, wherein one or more selected candidate channels of the nested carrier are not adjacent within the second frequency range.

5. The communications device according to claim 1, wherein the controller is configured in combination with the receiver
  to receive a second signaling message from the control channel of the first frequency range, the second signaling message providing an indication of a change in the one or more candidate channels which have been selected from the predefined plurality of candidate channels which form the nested carrier within the second frequency range and providing an indication of a change to the candidate channels forming the nested carrier, and
  to receive the signals representing the data from the nested carrier comprising the newly selected one or more candidate channels.

6. The communications device according to claim 1, wherein the nested carrier includes a control channel and a shared channel providing shared communications resources for allocation to the communications device for transmitting signals to or receiving signals from the mobile communications network, and the controller in combination with the receiver is configured
  to receive a third signaling message providing an allocation of communications resources to the communications device within the shared channel.

7. The communications device according to claim 1, wherein the controller is configured in combination with the transmitter
  to transmit the data via the wireless access interface using the first frequency range of the primary cell and using the nested carrier of the second frequency range forming the secondary cell, or
  to receive the data via the wireless access interface from the first frequency range of the primary cell and from the nested carrier of the second frequency range forming the secondary cell.

8. The communications device according to claim 1, wherein the minimum resource allocation of the candidate channel comprises a segment of communications resource comprising one sub-carrier.

9. The communications device according to claim 1, Wherein the minimum resource allocation of the candidate channel comprises a segment of communications resource comprising in frequency at least one physical resource block (PRB) of a wireless access interface operating in accordance with a Long Term Evolution standard.

10. The communications device according to claim 9, wherein the minimum resource allocation of the candidate channel comprises in frequency a segment of communications resource of six physical resource blocks of a wireless access interface operating in accordance with a Long Term Evolution standard.

11. The communications device according to claim 1, wherein the minimum resource allocation of the candidate channel comprises a segment of communications resource comprising twelve Orthogonal Frequency Division Multiplexing sub-carriers.

12. The communications device according to claim 7, wherein each candidate channel is of a baseband bandwidth suitable for use as a carrier of a wireless access interface operating in accordance with a Long Term Evolution standard.

13. A communications device for transmitting data to or receiving data from a mobile communications network providing a wireless access interface for transmitting signals to or receiving signals from the communications device, the communications device comprising:
  circuitry configured to
    transmit the signals to the mobile communications network via the wireless access interface;
    receive the signals from the mobile communications network via the wireless access interface;
    receive data transmitted to the communications device from the mobile communications network via the wireless access interface, the wireless access interface providing a primary carrier within a first frequency range, which forms a primary cell providing a contiguous set of communications resources across the first frequency range and providing one or more control channels for transmitting signaling messages to the communications device or receiving signaling messages from the mobile communications network;
    receive from the mobile communications network a signaling message identifying a nested carrier comprising one or more candidate channels selected from a plurality of candidate channels within a second frequency range in an unlicensed frequency band which is different to and mutually exclusive from the first frequency range, the plurality of candidate channels being predefined and determined without configuration signaling by the wireless access interface, each of the one or more selected candidate channels representing a minimum unit of communications resource which can be used to transmit data via the up-link or to receive data on the downlink, the one or more selected candidate channels in the second frequency range being formed into the nested carrier for providing a secondary cell, and the signaling message being transmitted from the mobile communications network via the control channel of the first frequency range and receive from the mobile communications network at least a part of the data or to transmit to the mobile communications network at least a part of the data within the nested carrier.

* * * * *